United States Patent [19]

Golestaneh

[11] Patent Number: 4,766,928
[45] Date of Patent: Aug. 30, 1988

[54] CONSTANT FLOW RATE CONTROL VALVE

[75] Inventor: Farhad Golestaneh, Dallas, Tex.

[73] Assignee: Packaged Systems, Inc., Dallas, Tex.

[21] Appl. No.: 923,179

[22] Filed: Oct. 27, 1986

[51] Int. Cl.⁴ .............................................. G05D 7/01
[52] U.S. Cl. ................................................... 137/504
[58] Field of Search ........................ 137/500, 503, 504

[56] References Cited

U.S. PATENT DOCUMENTS

| | | | |
|---|---|---|---|
| 3,015,341 | 1/1962 | Hedland | 137/504 X |
| 3,131,716 | 5/1964 | Griswold | 137/503 |
| 3,741,241 | 6/1973 | Jackson | 137/504 |
| 3,752,183 | 8/1973 | Griswold | 137/504 |
| 3,752,184 | 8/1973 | Griswold | 137/504 |

Primary Examiner—Robert G. Nilson
Attorney, Agent, or Firm—Gerald G. Crutsinger; John F. Booth; Norman L. Gundel

[57] ABSTRACT

In accordance with the present invention, a constant flow rate control valve is provided including a cup member disposed in the flow passage through the valve. The cup member has a port located in an end wall of the cup member and a plurality of ports in the sidewall of the cup member. The cup member is movable axially within the valve, with such movement being opposed by a resilient spring member downstream of the cup member. A fixed shear ring in the valve body surrounding the sidewall of the cup member blocks or exposes areas of the sidewall ports in response to movement of the cup member. Fluid pressure acting on the end wall of the cup member urges the cup member against the spring, so that the shear member exposes only that sidewall port area appropriate to the pressure being exerted. The sidewall ports have non-identical shapes and areas, with one or more longer sidewall ports extending further toward the end wall of the cup member than the other, shorter sidewall ports. The shape of the longer sidewall ports is such that the width of the longer port increases beyond a transverse plane of the cup member, which plane is defined by the end of the shorter sidewall ports, so that the width (and hence effective area) of the longer ports beyond that transverse plane effectively includes the design width of more than one port in the prior art.

13 Claims, 3 Drawing Sheets

CONSTANT FLOW RATE CONTROL VALVE

This invention relates to flow control valves and particularly to a constant flow rate control valve in which the flow rate of liquid through the valve is unchanged even though the pressure drop across the valve is varied. Such valves may be used in branching networks of hydraulic systems, where the distribution of fluid at design flow rates is of great importance. The operation of such systems is adversely affected if the flow rates in the various branches are changed from their designed values.

Constant flow rate control valves have numerous applications in piping networks. For example, in heating and cooling systems for office buildings, apartments, hospitals, schools, and the like, water or other liquid at an appropriate control temperature is pumped from a central station through a piping network to various heat exchange units associated with the rooms, corridors, offices, and other spaces of the building. Ordinarily, some of these heat exchange units are located relatively close to the central station from which the control temperature liquid is being pumped and other heat exchange units are located much further away. The fluid pressure applied across the inputs and outputs of the respective heat exchange units varies widely because of factors such as frictional losses inherent in the flow of the liquid through the piping network. Further, the desired liquid flow rate in various sectors of the piping network may change from time to time, for example, in response to the demands of local thermostatic controls or to compensate for sun load or wind load on certain exposures.

The flow rate in each branch of the network is a direct function of the pressure drop existing across that branch. Two contributors to the existence and magnitude of the pressure drop are line friction and equipment pressure drop. The actual pressure drop of a branch is often different from the original design value, leading to a flow rate in that branch which is different from the design flow rate, which also influences the flow rate of other branches. To obtain the design flow rate in the various branches of such a network, the network must be hydraulically balanced. Hydraulic balancing often involves adding additional pressure to the system and creating wasteful pressure drops. Because of this need for additional pressure, pumps, which are the source of the pressure input to the system, are frequently either oversized or operated at other than their optimum performance condition, requiring additional energy consumption.

Some present branching networks of hydraulic systems are balanced or equalized by a manually adjusting in-line valves provided for that purpose in each branch. Other branching networks are balanced by an automatic device in each branch which regulates the flow of fluid through the branch in response to the pressure in the branch.

Automatic control can be accomplished by either external sensing and control or by an internal mechanism. The internal control mechanisms are varied in accuracy and complexity and operating range. Some of these internal control devices have several moving parts and levers which, for example, cause the movement of a metering needle inside a passage cavity to control the flow. Such devices ordinarily require clean fluids.

Other automatic internal control valves attempt to create a reacting movement with respect to pressure variations and to translate this movement into an increase or reduction of the area of the flow passage. Prior art valves of this type, due to the nature of their design and to their need for a pressure differential across the valve in order to operate the device, add an excess pressure drop to the branch which must be overcome by the addition of extra energy or pressure to the branching network. Prior art internal control valves include those disclosed in U.S. Pat. Nos. 3,131,716, 3,256,905, 3,752,183 and 3,752,184, all to Griswold, and in U.S. Pat. No. 3,854,497 to Rosenberg.

Griswold U.S. Pat. No. 3,131,716 discloses an internal flow control valve including a movable cup element having a plurality of identical sidewall ports continuously decreasing in lateral width from one end of the port to the other. Pressure differential across the valve moves the cup element against a resilient spring to expose a port area appropriate for a constant flow rate at that pressure differential. Additional circular ports in the sidewall of the cup element are always exposed. Griswold U.S. Pat. No. 3,256,905 discloses the use of more than one such cup element in parallel in a single branch of a branching network system. The internal flow control valves of both of these systems provide ports in the sidewalls of the cup element having extremely narrow passages. Particulate matter such as scale and other contaminants can easily clog the narrow ports, thereby altering the effective area of the port. The accumulation of such particulate matter can also inhibit the movement of the cup member, which movement is necessary for proper operation of the internal flow control valve.

Griswold U.S. Pat. No. 3,752,184 discloses a constant flow rate control valve having a plurality of staggered short port segments in the sidewall of a cup element spaced between the ends of the cup element. All port segments decrease continuously in lateral width from one end to the other end of the port segment and axially adjacent port segments are laterally offset from each other. The use of short port segments is said to provide greater strength in the cup member and to eliminate the need for reforming the cylindrical portion of the cup member after the ports are cut. However, the various port segments remain narrow, thereby remaining susceptible to clogging by particulate matter suspended in the fluid. In one embodiment, each alternate series of port segments is provided with one wider port which is said to produce the same flow characteristics as two separate thin ports. Tests are reported to show that the same flow rate is achieved for the same total exposed port area whether a few large sidewall ports or many small sidewall port segments are employed.

Griswold U.S. Pat. No. 3,752,183 discloses that the clogging of ports by particulate matter may be reduced or avoided by providing a cup member having a tapered outer sidewall surface in conjunction with sidewall ports or port segments in order to maintain the constant flow rate characteristics without requiring provision of ports or port segments which are extremely narrow in width.

Rosenberg U.S. Pat. No. 3,854,497 discloses a combination shut-off and flow control valve having a cup member movably mounted in a rotatable valve member. Various positions of the rotatable valve member shut off either or both of the inlet and outlet to the valve. When the valve member is rotated to a position wherein both the inlet and outlet are shut off, the cup member is aligned with an access port through which the cup member may be replaced. The movable cup member is provided with calibrations so that its position may be observed through an observation port during ordinary operation of the valve.

OBJECTS OF THE INVENTION

Wherefore, it is an object of this invention to provide an improved constant flow rate control valve.

It is a further object of this invention to provide a constant flow rate control valve in which a major portion of the flow through the valve passes through one large fixed area end wall port resulting in less fluid friction loss as compared to the many small fixed area sidewall ports of prior art valves.

It is a further object of this invention to provide a local temporary increased pressure drop zone for fluid flowing through variable area sidewall ports by causing the flow through the fixed area port to provide a reduced pressure region inside the cup members of the valve.

It is a further object of this invention to provide a reduced active force on the cup element by providing a fixed area port in the end wall thereof, reducing the end wall area for pressure to act upon.

It is a further object of this invention to provide a constant flow rate control valve which does not require clean fluids for proper operation.

It is a further object of this invention to provide a constant flow rate control valve having wider sidewall ports which are less likely to trap and be clogged by particulate matter in the fluid flowing through the valve.

It is a further object of this invention to provide a constant flow rate control valve in which the narrowest portion of a plurality of prior art sidewall ports or port segments is replaced by fewer, wider ports or port segments.

It is a further object of this invention to provide a constant flow rate control valve having a non-linear wave or helical spring which allows variable area sidewall ports to have a unique profile and shorter height than would be required by a linear spring.

It is a further object of the invention to provide a constant flow rate control valve providing a shoulder upon which the cup member bears at maximum compression to avoid possible damage to the spring from overcompression.

It is a further object of the invention to provide a constant flow rate control valve having a smooth turning fluid boundary provided by a smoothly curved shear ring adjacent the variable area sidewall ports of the cup member.

It is a further object of this invention to provide a constant flow rate control valve having a port in the end wall of the cup element with a smooth curvature about the boundary of the port to reduce the pressure drop of the fluid flowing through the port.

SUMMARY OF THE INVENTION

In accordance with the present invention, a constant flow rate control valve is provided including a cup member disposed in the flow passage through the valve. The cup member has a port located in an end wall of the cup member and a plurality of ports in the sidewall of the cup member. The cup member is movable axially within the valve, with such movement being opposed by a resilient spring member downstream of the cup member. A fixed shear ring in the valve body surrounding the sidewall of the cup member blocks or exposes areas of the sidewall ports in response to movement of the cup member. Fluid pressure acting on the end wall of the cup member urges the cup member against the spring, so that the shear member exposes only that sidewall port area appropriate to the pressure being exerted. The sidewall ports have non-identical shapes and areas, with one or more longer sidewall ports extending further toward the end wall of the cup member than the other, shorter sidewall ports. The shape of the longer sidewall ports is such that the width of the longer port increases beyond a transverse plane of the cup member, which plane is defined by the end of the shorter sidewall ports, so that the width (and hence effective area) of the longer ports beyond that transverse plane effectively includes the design width of more than one port in the prior art.

In an alternative embodiment, the end wall of the cup member may be provided with a spring loaded cap which opens a port beneath the cap at lower pressures but closes that port at higher pressures. This capped port may be provided instead of or in addition to an uncapped port in the end wall of the cup member.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that the description is not intended to limit the invention to the described embodiment. On the contrary, it is intended to cover all alternatives, modifications and equivalents as may be included within the spirit and scope of the invention as defined by the appended claims.

DETAILED DESCRIPTION OF THE INVENTION

Figure 1:
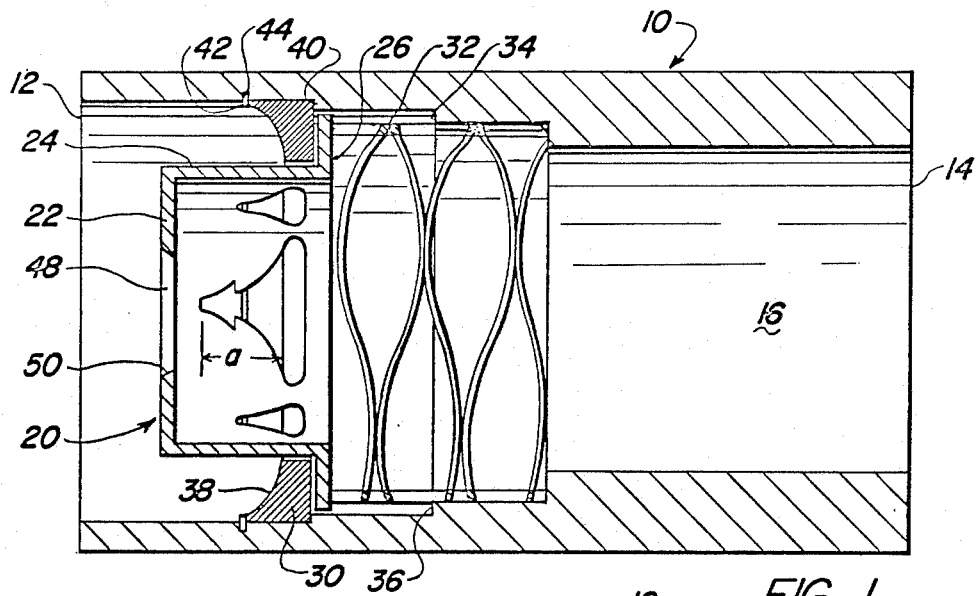
FIG. 1 is an axial sectional view of the constant flow rate control valve of the invention.

Turning first to FIG. 1, there is shown the constant flow rate control valve 10 of the invention. The valve 10 is provided with an inlet 12 at one end connected to an outlet 14 at the opposite end by a bore 16 therethrough. The valve 10 is adapted for liquid flow through the bore 16 in the direction from the inlet 12 to the outlet 14. The valve 10 is adapted for installation in the liquid flow path of an individual branch of a branching hydraulic system network by means disposed at the inlet 12 and outlet 14 in a manner well known in the art, such as by threads, not shown.

Figure 2:
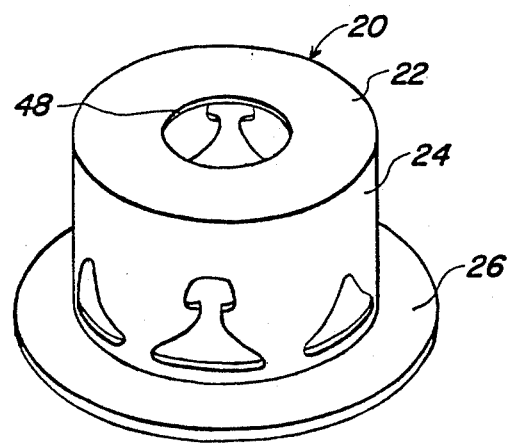
FIG. 2 is a perspective view of the cup member of the constant flow rate control valve of FIG. 1.

The valve 10 is provided with a cup member 20, also shown in FIG. 2. The cup member 20 includes an end wall 22, a sidewall 24 and a surrounding flange 26. The axis of the cup member 20 is aligned with the axis of the bore 16 of the valve 10, with the end wall 22 being nearest the inlet 12.

A shear ring 30 is provided within the bore 16 of the valve 10. When no fluid is flowing through the valve 10, the surrounding flange 26 of the cup member 20 is urged against the downstream side of the shear ring 30 by the force of a partially compressed spring 32 acting upon the downstream side of the surrounding flange 26. The spring 32 is partially compressed between the surrounding flange 26 and a first shoulder 34 of the bore 16. A second shoulder 36 in the bore 16 is located intermediate the shear ring 30 and the first shoulder 34. The second shoulder 36 limits the motion of the cup member 20 to prevent overcompression of the spring 32. The spring 32 may be a conventional coil spring or, as is preferred, a nonlinear wave or helical spring. The use of the preferred nonlinear spring 32 permits a smaller possible displacement of the cup member 20.

The shear ring 30 is preferably made of a wear-resistant material such as aluminum or brass and has a curved upstream surface 38 to direct flowing liquid toward the sidewall 24 of the cup member 20. The shear ring 30 rests upon a third shoulder 40 of the bore 16 and is maintained in that location by a snap ring 42 located in a groove 44 of the valve 10.

The circular cup member 20 fits closely within a round orifice 46 of the shear ring 30. The end wall 22 of the cup member 20 is preferably perpendicular to the axis of the valve. The cup member 20 is preferably provided with a single circular port 48 in the center of the end wall 22. This circular port 48 has a rounded edge 50 to reduce the pressure loss of fluid flowing through the port 48 by reducing turbulence about the edge 50 of the port 48. The outer surface of the sidewall 24 of the cup member 20 is preferably parallel to the axis of the valve 10 and has a plurality of ports 52 therein.

Figure 3:
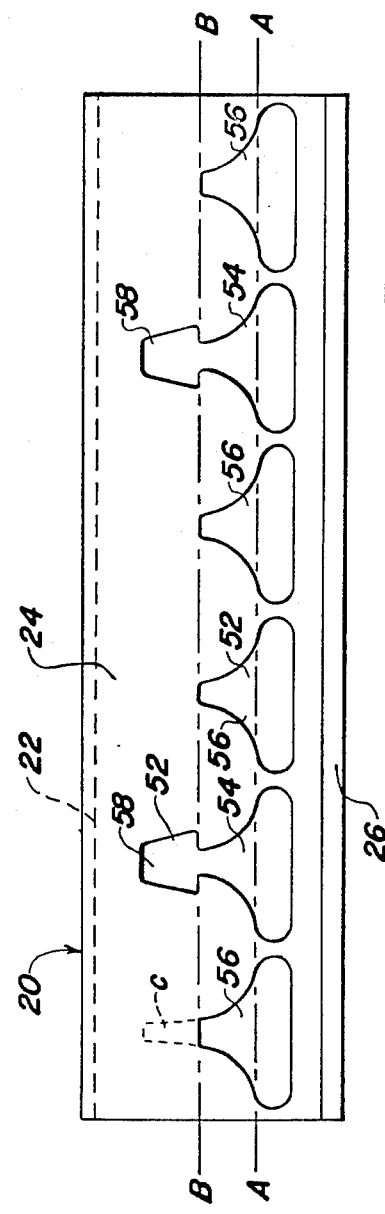
FIG. 3 is a diagrammatic developed view illustrating the layout of the ports of the sidewall of the cup element of FIG. 2.

FIG. 3 is a two-dimensional depiction of the sidewall 24 and the ports 52 thereof as though the sidewall 24 had been unrolled. The sidewall of FIG. 3 is shown provided with six ports 52, two long ports 54 and four short ports 56. An extension of the left most short port 56 as indicated by the dashed line C depicts the shape of six identical ports having areas equivalent to the two long ports 54 and four short ports 56 actually shown. As can be seen, the four short ports terminate at a transverse plane of the cup member indicated by the dashed line B—B. The equivalent area above the dashed line B—B of the six ports is instead provided above the dashed line B—B by the wider upper portions 58 of the two long ports 54. By thus combining the six narrow portions C into the two wider portions 58, equivalent areas are provided while reducing the tendency of narrow ports such as C to be clogged by particulate matter such as scale which may be suspended in the liquid flowing through the valve 10.

The area of the ports below the dashed line A—A is always blocked by the shear ring 30. The shape of the areas below the dashed line A—A is thus of relatively lesser importance to the flow characteristic of the valve and is designed primarily to minimize the likelihood of clogging by a particulate matter flowing through the valve.

Pressure differential between the inlet 12 and the outlet 14 of the valve causes liquid under pressure to flow through the bore 16 of the valve 10. The area of the circular port 48 and the sidewall ports 52 of the cup member present the greatest restriction in the flow path of the liquid through the bore 16. Thus a substantial portion of the pressure differential between the inlet 12 and the outlet 14 occurs across the ports 48 and 52 themselves. This differential pressure acting on the upstream and downstream surfaces of the end wall 22 produces a net downstream force on the cup member 20, which force compresses the spring 32. A greater pressure drop causes downstream movement of the cup member 20 and a greater compression of the spring 32.

Axial movement of the cup member 20 within the shear ring 30 varies the effective area of the sidewall ports 52 as portions of the sidewall ports 52 are blocked or unblocked by the shear ring 30. The second shoulder 36 is sufficiently spaced from the shear ring 40 so that the cup member 20 may move at least the distance shown as dimension "a" in FIG. 1. This variation in the area of the sidewall ports 52 is responsive to the pressure differential acting on the end wall 22 of the cup member 20. The sidewall ports 54 are sized through calculation and experimentation so that the change in the pressure acting on the cup member 20 is offset by the change in the total effective port area of the cup member 20 so that the flow rate of fluid through the valve 10 is constant over a wide range of variation in the pressure drop across the valve 10. The valve 10 incorporates basic fluid mechanics relationships, especially the Bernouli's equation for flow. The flow through a circular opening in an orifice plate is governed by the equation $$Q = KA\ DP \quad (1)$$

where
DP = pressure differential imposed across the plate, (P1−P2)
A = area of the opening in the plate
Q = flow rate
K = orifice coefficient The opening can be sized to provide a desired flow rate based on a given pressure differential or, at a given pressure differential, a desired flow rate can be obtained by providing the required area. To provide a controlled rate of flow, when a varying pressure differential exists, the area of the orifice must be constantly changed to provide a constant flow rate condition. In the valve 10, the cup member 20 functions as a piston and spring combination to provide an axial movement responsive to the pressure variation. For a desired minimum and maximum pressure differential control range such as 3 to 40 psi, the size of the circular port 48 of the end wall 22 of the cup member 20 is selected to allow the passage of the desired flow rate Q at the maximum pressure of the control range. The portion of flow which will pass through the circular port 20 is given by the equation set forth above. At any pressure differential less than the maximum, the balance of flow must be supplied through the variable area sidewall ports 52 of the cup member 20. The sidewall ports 52 must flow high volumes at lower pressure differentials and gradually decreasing to no flow at the upper limit of the pressure differential.

The relationship between the area of the variable area sidewall ports 52 and the pressure differential across the valve is $$A = \frac{Q(\text{variable})}{K\,DP} \quad (3a)$$

The rate of change of A (area) with respect to the differential pressure is $$\frac{dA}{d(DP)} = -\frac{1}{2} \frac{Q}{K} DP^{-3/2} \quad (3b)$$

The incremental variation of area is $$= \frac{A_1 - A_2}{DP_1 - DP_2} \quad (3c)$$

This area is also a function of the compression of the spring 32 and it is strongly dependent on the non-linearity of the preferred spring 32. The amount of the axial movement of the cup member 20 is calculated by the amount of pressure differential existing across the end wall 22 of the cup member 20 and the characteristic of the spring constant. The shape of this area can be obtained by solving this equation using a finite difference method.

Depending on the flow rate desired, larger or smaller end wall and sidewall ports 50 and 52 or a greater or lesser number of sidewall ports 52 may be required. The shape of the sidewall ports 52 are each unique and are computed for any particular flow rate. The sidewall ports 52 are designed to provide the maximum width for each sidewall port 52. This is achieved by combining narrow upper portions "C" of multiple sidewall ports into fewer larger sidewall ports as shown in FIG. 3.

The valve 10 shown in FIGS. 1, 2 and 3 provides six sidewall ports 52, including two long ports 54 and four short ports 56. As discussed above, the short ports 56 terminate and the long ports become wider at the transverse plane B—B shown in FIG. 3. The invention also includes valves having different configurations, for example, a valve (not shown) having four short sidewall ports, two intermediate sidewall ports and two long sidewall ports: all of the ports extend from below the shear ring to a first transverse plane B1—B1, where the four short ports terminate. The remaining four ports (two intermediate and two long) become wider above B1—B1 to include the theoretical area of all eight ports. The two intermediate ports terminate at a second transverse plane, B2—B2 where the two long ports are widened to include their theoretical width. In this manner, the area of eight theoretical sidewall ports is provided first by eight ports, then by four ports, and finally by two ports as the theoretical width of eight ports narrows. Thus, the greatest possible port width is provided. Also, in some applications, the width of the sidewall ports is great enough that no combining of top sections is necessary.

Figure 4:
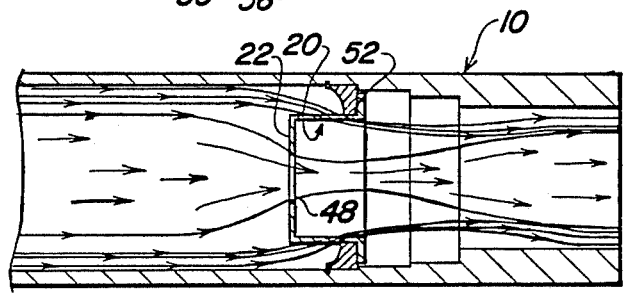
FIG. 4 is an axial sectional view of the valve of the invention showing the fluid flow paths through the valve.

FIG. 4 depicts the liquid flow through the valve 10. The flow pattern developed by the circular port 48 in the end wall 22 of the cup member 20 is contracted after passage through the circular port 48, reducing turbulence and pressure drop caused by contact of the swiftly flowing liquid with the base walls and internal parts of the valve 10.

Figure 5:
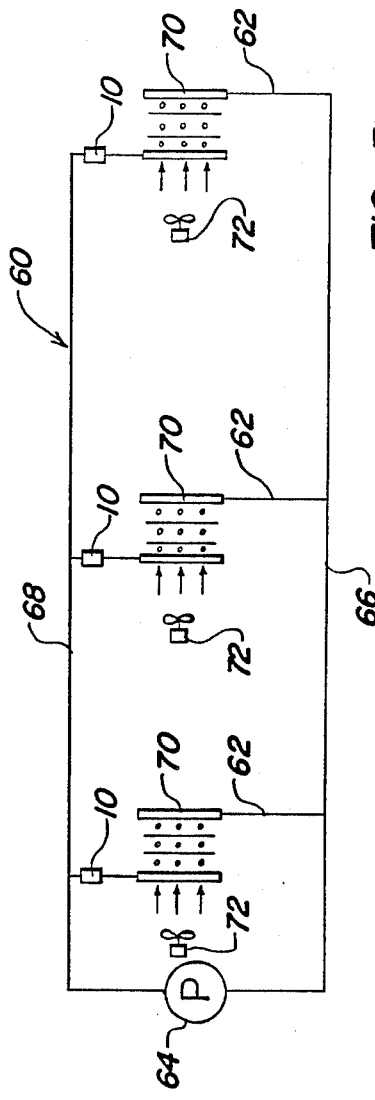
FIG. 5 is a schematic representation of a branching network incorporating the valve of the invention.

FIG. 5 shows branching network 60 incorporating a valve 10 in each branch 62 of the network 60. The network includes a pump 64 which is provided with a suction pipe 66 and a discharge pipe 68. FIG. 5 shows three branches 62 in which liquid supplied by the pump discharge pipe 68 under pressure flows first through a constant flow rate control valve 10 and then through a heat exchanger 70 provided with a fan 72 and returns to the pump 64 through the suction pipe 66. As long as the pressure differential across the valve 10 of each branch 62 is within the operating range of the valve 10, the valve will maintain the constant liquid flow rate through that branch 62.

Figure 6:
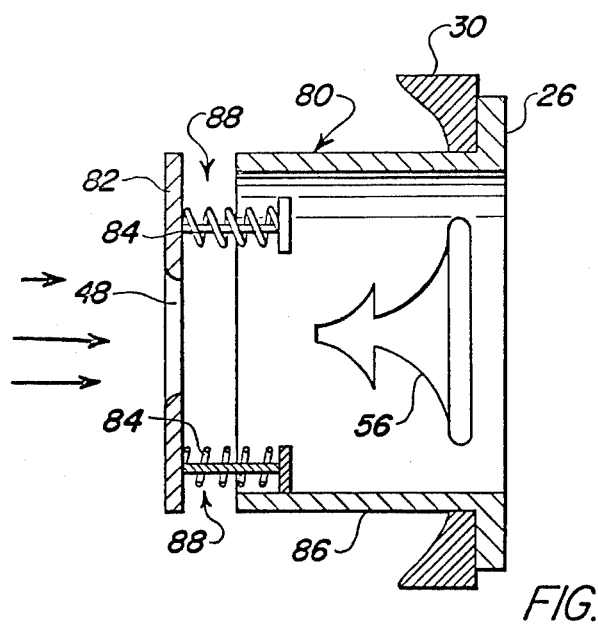
FIG. 6 is an axial sectional view of the cup member of a first alternative embodiment of the invention.
Figure 7:
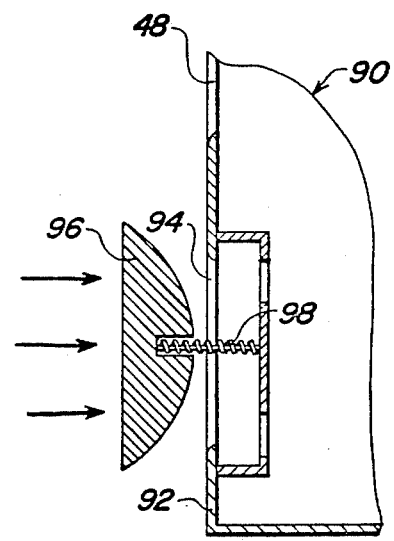
FIG. 7 is a partial axial sectional view of the cup member of a second alternative embodiment of the invention.

FIGS. 6 and 7 show two alternative embodiments of the invention. The embodiment of FIG. 6 employs a cup member 80 capable of operating at low pressure differentials. The end wall 82 is movably mounted to the sidewall 86 of the cup member 80 by springs 84. Higher pressure differentials within the operating range of the valve urge the end wall 82 against the sidewall 86, and the valve having the cup member 82 operates as the above described valve 10. However, at very low pressure differentials, the springs 84 urges the end wall 82 away from the sidewall 86, creating a peripheral gap 88 therebetween. The area of this gap increases the flow capacity of the valve at very low pressure differentials so that the constant flow rate operating range of the valve can be expanded to lower pressure differentials.

FIG. 7 depicts a partial sectional view of the cup member 90 of a second alternative embodiment. The cup member 90 includes an end wall 92 having both a circular port 48 and an additional low pressure port 94. An inverted cone 96 is movably mounted to the end wall by a spring 98. At higher pressure differentials, the pressure acting on the cone 96 urges it into engagement with the end wall 92, closing the low pressure port 94 so that the valve having the cup member 90 operates as the above described valve 10. At lower pressure differentials the spring 98 urges the low pressure port 94 to open, increasing the total port area available and increasing the flow capacity of the valve at low pressure differentials. In this manner, the constant flow rate operating range of the valve can be expanded to lower pressure differentials.

Figure 8:
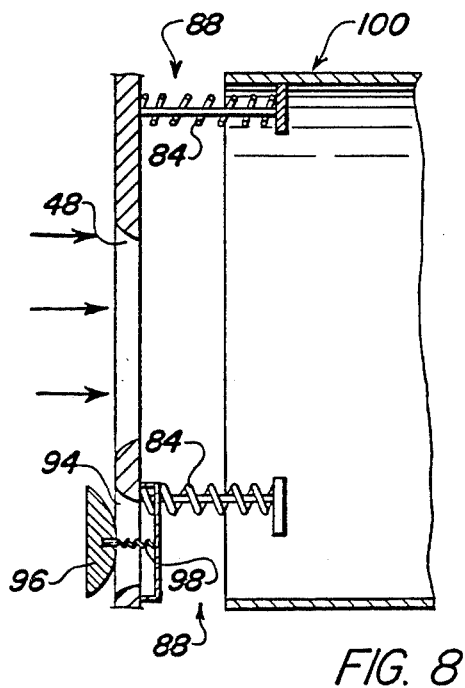
FIG. 8 is a partial axial sectional view of the cup member of a third alternative embodiment of the invention.

As shown in FIG. 8, the low pressure differential features of the cup member 80 of FIG. 6 and the cup member 90 of FIG. 7 can be provided in one valve having a cup member 100.

Thus, it is apparent that there has been provided, in accordance with the invention, a constant flow rate control valve that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A constant flow rate control valve including a valve body having a flow passage; a cup member in the flow passage, said cup member having a cylindrical sidewall and an end wall defining an interior of said cup member, said cylindrical sidewall having a plurality of side extending therethrough; a shear plate having a central aperture extending therethrough, said cup member being movably disposed in said aperture so that movement of said cup member within said aperture varies the area of at least some of said side ports; and means resiliently urging said cup through said aperture such that flow through said flow passage impinges said end wall and flows through said side ports, the improvement comprising: an orifice port formed in said end wall, said orifice port being positioned and configured such that a stream of liquid flowing through said orifice port is contracted after passage through said orifice port forming an area of reduced turbulence and reduced pressure inside said cup member adjacent said side ports in the cylindrical sidewall of the cup member and such that the total flow of liquid into said interior through said orifice port and through said side ports including said variable area side ports is substantially constant over a range of pressure differentials across said valve, which range is sufficient to vary the area of at least one said variable are side port between its minimum and maximum areas, and wherein the size of said orifice port is sufficient to allow said substantially constant total flow of liquid to pass through said orifice port at the upper end of said range of pressure differential.

2. A constant flow rate control valve including a valve body having a flow passage; a cup member in the flow passage, said cup member having a cylindrical sidewall and an end wall defining an interior of said cup member, said cylindrical sidewall having a plurality of side ports extending therethrough; a shear plate having a central aperture extending therethrough, said cup member being movably disposed in said aperture so that movement of said cup member within said aperture varies the area of at least some of said side ports; and means resiliently urging said cup through said aperture such that flow through said flow passage impinges said end wall and flows through said side ports, the improvement comprising: an orifice port formed in said end wall, said orifice port being positioned and configured such that a stream of liquid flowing through said orifice port is contracted after passage through said orifice port forming an area of reduced turbulence and reduced pressure inside said cup member adjacent said side port in the cylindrical saidewall of the cup member, with said side ports in the cylindrical side wall of said cup member comprising long ports and short ports circumferentially spaced around said side wall, and such that the total flow of liquid into said interior through said orifice port and through said side ports including said variable area side ports is substantially constant over a range of pressure differentials across said valve, which range is sufficient to vary the area of said variable area side ports between zero and their maximum areas.

3. A constant flow rate control valve according to claim 2, said short ports terminating in a transverse plane extending transversely of said cup member and perpendicular to a central axis of said cup member.

4. A constant flow rate control valve including a valve body having a flow passage; a cup member in the flow passage, said cup member having a cylindrical sidewall and an end wall, said cylindrical sidewall having a plurality of side ports extending therethrough, said side ports in the cylindrical side wall of said cup member comprising long ports and short ports circumferentially spaced around said side wall terminating in a transverse plane extending transversely of said cup member and perpendicular to a central axis of said cup member, said long ports being formed by edges which converge toward each other on one side of said transverse plane and which diverge from each other on the other side of said transverse plane; a shear plate having a central aperture extending therethrough, said cup member being movably disposed in said aperture; and means resiliently urging said cup through said aperture such that flow through said flow passage impinges said end wall and flows through said side ports, said end wall having an orifice port formed therein, said orifice port being positioned and configured such that a stream of liquid flowing through said orifice port is contracted after passage through the orifice port forming an area of reduced turbulence and reduced pressure inside said cup member adjacent said side ports in the cylindrical sidewall of the cup member.

5. A constant flow rate control valve including a valve body having a flow passage; a cup member in the flow passage, said cup member having a cylindrical sidewall and an end wall, said cylindrical sidewall having a plurality of long and short side ports extending through and being circumferentially spaced around said sidewall, said short ports terminating in a transverse plane extending transversely of said cup member and perpendicular to a central axis of said cup member, said long side ports having a width which increases beyond said tranverse plane such that the width of the longer ports decreases on one side of transverse plane and increases on the other side of said transverse plane, said end wall having an orifice port and configured such that a stream of liquid flowing through said orifice port is contracted after passage through the orifice port forming an area of reduced turbulence and reduced pressure inside said cup member adjacent said side ports in the cylindrical sidewall of the cup member and adjacent said transverse plane; a shear plate having a central aperture extending therethrough, said cup member being movably disposed in said aperture; and means resiliently urging said cup through said aperture such that flow through said flow passage impinges said end wall and flows through said side ports.

6. A constant flow rate control valve according to claim 4 with the addition of means movably securing the end wall adjacent an end of said cylindrical sidewall; means resiliently urging said end wall away from said cylindrical sidewall to create a peripheral gap between said end wall and the end of said sidewalls around said stream of liquid flowing through said orifice port.

7. A constant flow rate control valve according to claim 6, said end wall having a plurality of ports formed therein, said ports being spaced circumferentially around said orifice port; closure means adjacent each of said ports; and means resiliently urging said closure means away from said port.

8. A constant flow rate control valve according to claim 4, said end wall having a plurality of ports formed therein, said ports being spaced circumferentially around said orifice port; closure means adjacent each of said ports; and means resiliently urging said closure means away from said port.

9. A constant flow rate control valve according to claim 4, said shear plate having a curved surface to direct a portion of liquid flowing through the flow passage in the valve body toward said side ports.

10. A constant flow rate control valve according to claim 4 with the addition of an outwardly extending flange secured to said cylindrical sidewall, said flange being spaced from said end wall.

11. A constant flow rate control valve according to claim 10, said flange being positioned adjacent said shear plate.

12. A circular cup member adapted for use in a flow passage in a constant flow rate control valve comprising: a general cylindrical sidewall having a plurality of side ports extending therethrough; a transversely extending end wall secured across an end of said cylindrical sidewall, said end wall having an orifice formed therein, said side ports in said sidewall comprising long ports and short ports, said short ports terminating in a transverse plane spaced from and generally parallel to said end wall, said long ports extending beyond said transverse plane toward said end wall, said long ports having edges which converge in a direction toward said transverse plane on one side of said transverse plane and which diverge toward said transverse plane on the other side of said transverse plane.

13. A cup member according to claim 12, with the addition of an outwardly extending flange secured to said cylindrical sidewall, said flange being spaced from said end wall.

* * * * *

UNITED STATES PATENT AND TRADEMARK OFFICE
CERTIFICATE OF CORRECTION

PATENT NO. : 4,766,928
DATED : August 30, 1988
INVENTOR(S) : Farhad Golestaneh

It is certified that error appears in the above-identified patent and that said Letters Patent is hereby corrected as shown below:

In Column 9, line 17, delete "are" and insert -- area --; and in Column 9, line 41, delete "saidewall" and insert -- sidewall --.

Signed and Sealed this

Tenth Day of January, 1989

*Attest:*

DONALD J. QUIGG

*Attesting Officer*      *Commissioner of Patents and Trademarks*